(12) United States Patent
Kido et al.

(10) Patent No.: US 8,913,255 B2
(45) Date of Patent: Dec. 16, 2014

(54) RECORDING MEDIUM

(71) Applicant: Brother Kogyo Kabushiki Kaisha, Nagoya-shi, Aichi (JP)

(72) Inventors: Daisuke Kido, Nagoya (JP); Yongqi Sun, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/706,947

(22) Filed: Dec. 6, 2012

(65) Prior Publication Data

US 2013/0148142 A1   Jun. 13, 2013

(30) Foreign Application Priority Data

Dec. 7, 2011   (JP) .................. 2011-267918

(51) Int. Cl.
*G06F 15/00* (2006.01)
*G06F 17/21* (2006.01)
*G06F 3/12* (2006.01)
*B41J 3/46* (2006.01)
*G06F 17/24* (2006.01)
*G06K 15/02* (2006.01)
*B41J 3/407* (2006.01)

(52) U.S. Cl.
CPC ............ *G06K 15/024* (2013.01); *G06F 17/214* (2013.01); *G06F 3/1251* (2013.01); *G06F 3/1231* (2013.01); *B41J 3/46* (2013.01); *G06F 3/1208* (2013.01); *G06F 3/1256* (2013.01); *G06F 17/248* (2013.01); *G06F 3/1257* (2013.01); *G06K 15/1889* (2013.01); *B41J 3/4075* (2013.01); *G06F 17/211* (2013.01); *G06K 15/022* (2013.01)

USPC ........................................ 358/1.11

(58) Field of Classification Search
CPC .................. G06F 3/1257; G06F 3/1243
USPC ........................................ 358/1.11
See application file for complete search history.

(56) References Cited

U.S. PATENT DOCUMENTS

| | | | |
|---|---|---|---|
| 7,588,380 B2 | 9/2009 | Suzuki et al. | |
| 2005/0057761 A1* | 3/2005 | Sakai et al. | 358/1.2 |
| 2006/0222431 A1* | 10/2006 | Kato et al. | 400/621 |

FOREIGN PATENT DOCUMENTS

| | | |
|---|---|---|
| JP | 11-232276 | 8/1999 |
| JP | 2000227790 | 8/2000 |
| JP | 2007-108909 | 4/2007 |
| JP | 2007-172387 | 7/2007 |

* cited by examiner

Primary Examiner — Saeid Ebrahimi Dehkordy
(74) Attorney, Agent, or Firm — McCarter & English, LLP

(57) ABSTRACT

This disclosure discloses a non-transitory computer-readable recording medium, storing a fixed form print information processing program for executing steps on a control device. The steps comprises a fixed form print producing step for producing fixed form print information, a margin area deleting step for deleting a width direction margin area of the width direction margin area and a longitudinal direction margin area respectively set on each side of both ends in a tape width direction as well as each side of both ends in a tape longitudinal direction of font data corresponding to a character string included in the fixed form print information, a fixed form print displaying step for displaying on the display device the fixed form print information from which the margin area has been deleted, and a fixed form print transferring step for transferring the fixed form print information to the print label producing apparatus.

6 Claims, 12 Drawing Sheets

PC FONT (LONG VERTICAL TEXT)

"d" DOES NOT FIT BELOW "c"
SINCE "d" HAS A MARGIN.

PRINTER FONT (LONG VERTICAL TEXT)

"d" FITS BELOW "c"
SINCE "d" DOES NOT HAVE A MARGIN.

RECORDING MEDIUM

CROSS-REFERENCE TO RELATED APPLICATION

The present application claims priority from Japanese Patent Application No. 2011-267918, which was filed on Dec. 7, 2011, the disclosure of which is incorporated herein by reference in its entirety.

BACKGROUND

1. Field

The present disclosure relates to a recording medium on which a fixed form print information processing program used by an operation terminal connected to a print label producing apparatus is recorded.

2. Description of the Related Art

There are already known systems wherein an operation terminal (computer device) and print label producing apparatus (tape printer) are connected, making it possible for an operator to produce a print label (printed tape) by operating the print label producing apparatus via the operation terminal. According to this prior art, the print label producing apparatus is capable of using fixed form print information (a so-called template), making it possible for an operator to simply produce a print label of a desired mode. Further, a predetermined application program (editor) for producing fixed form print information is preinstalled in computing device of the operation terminal, making it possible for the operator to edit the contents of the fixed form print information as desired. The operator can verify the contents of the edited fixed form print information via a display by display device, and then transfer the fixed form print information to the print label producing apparatus.

The prior art has the following problems. That is, the fixed form print information includes, for example, a diagram section of frames, ruled lines, and the like, and a character string section suitably disposed in a position associated with that diagram section. The operation terminal comprises a PC, etc., and thus, from the operator viewpoints of visibility and aesthetics, fonts are normally prepared for a character string that comprise both a width direction margin on both tape width direction end sides and a longitudinal direction margin on both tape longitudinal direction end sides of the character string. On the other hand, the print label producing apparatus forms print on a printed tape restricted in size in the tape width direction and thus, unlike the above, often has fonts prepared for a character string that do not have a width direction margin on both tape width direction end sides of the character string. Accordingly, when fixed form print information edited by the operator as previously described is transferred to a print label producing apparatus and a print label is produced using that fixed form print information, the difference between whether or not the font margin described above is present may cause the mode of the character string formed into print on the print label to differ from the mode intended by the operator when the operator edited the fixed form print information.

SUMMARY

It is therefore an object of the present disclosure to provide a recording medium capable of preventing the mode of the character string formed into print on a print label from differing from the mode intended by the operator when the operator edited the fixed form print information, thereby improving convenience.

In order to above-described object, according to the aspect of the present application, there is provided a non-transitory computer-readable recording medium, storing a fixed form print information processing program for executing steps on a control device, the control device provided to an operation terminal that is configured to be connected to a print label producing apparatus configure to form desired print on a tape to produce a print label and comprises an operation device, a display device, the control device, and font data that expresses the shape of characters, the steps comprising: a fixed form print producing step for producing fixed form print information used by the print label producing apparatus when producing the print label, using a predetermined application program for producing fixed form print information preinstalled on the operation terminal, based on an operation via the operation device; a margin area deleting step for deleting at least a width direction margin area of the width direction margin area and a longitudinal direction margin area respectively set on each side of both ends in a tape width direction as well as each side of both ends in a tape longitudinal direction of font data corresponding to a character string included in the fixed form print information, by the application program for producing fixed form print information; a fixed form print displaying step for displaying on the display device the fixed form print information from which the margin area has been deleted in the margin area deleting step; and a fixed form print transferring step for transferring the fixed form print information displayed in the fixed form print displaying step to the print label producing apparatus using a predetermined application program for transferring fixed form print information preinstalled on the operation terminal.

The target operation terminal of the present disclosure is connected to a print label producing apparatus. The operator can produce a print label by operating the print label producing apparatus via the operation terminal. At this time, the print label producing apparatus is capable of using fixed form print information (a so-called template), making it possible for the operator to simply produce a print label of a desired mode. According to the fixed form print information processing program of the present disclosure, a fixed form print producing step and a margin area deleting step are executed in the operation terminal to avoid adverse effects that result from inconsistency between the margins of the font on the operation terminal side and the margins of the font on the print label producing apparatus side.

That is, in the fixed form print producing step, fixed form print information is produced by an application program for producing fixed form print information based on an operation of the operator via an operation device. At this time, the application program for producing fixed form print information that is installed in the operation terminal normally has a width direction margin area set on both tape width direction end sides of the character string and a tape longitudinal direction margin area set on both tape longitudinal direction end sides of the character string included in the fixed form print information. Here, in the margin area deleting step, at least the width direction margin area of the width direction margin area and longitudinal direction margin area is deleted. The fixed form print information with the width direction margin area thus deleted is displayed on the display device in the fixed form print displaying step, and then transferred to the print label producing apparatus in the fixed form print transferring step.

As described above, according to the present disclosure, at least the width direction margin area of the margin areas automatically set around the character string of the fixed form print information is deleted and displayed on the operation terminal. Subsequently, the fixed form print information is transferred to the print label producing apparatus. With this arrangement, the mode of the character string formed into print by the print label producing apparatus can be made to conform closer to the mode of the character string intended by the operator when the operator edited the fixed form print information on the operation terminal. As a result, the convenience can be improved for the operator.

DETAILED DESCRIPTION OF PREFERRED EMBODIMENTS

The following describes one embodiment of the present disclosure with reference to accompanying drawings.

A label manufacturing system comprising a print label producing apparatus which serves as the operation target of this embodiment will now be described with reference to FIG. 1.

Figure 1:
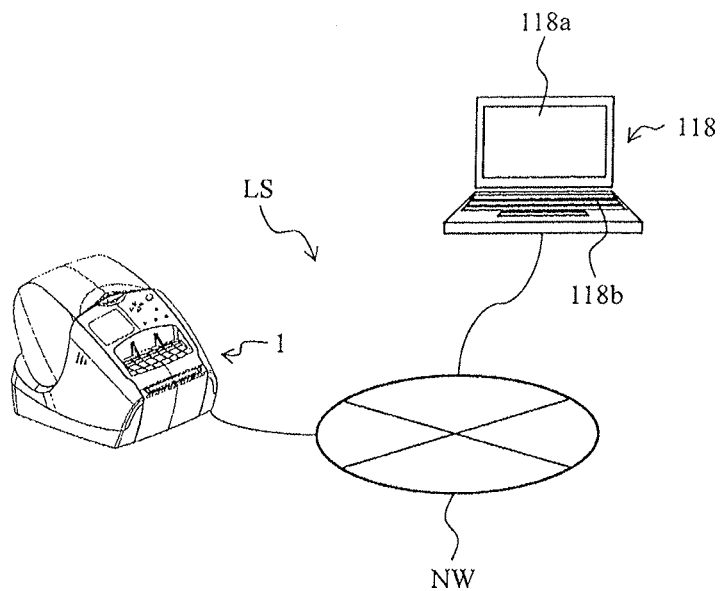
FIG. 1 is a system configuration diagram showing a label manufacturing system comprising the print label producing apparatus of an embodiment of the present disclosure.

In a label manufacturing system LS shown in FIG. 1, a print label producing apparatus 1 is connected to a PC 118 via a communication line NW which is either wired or wireless. The above described PC 118 has a control part comprising a display part 118$a$, such as a liquid crystal display, etc., an operation part 118$b$, such as a keyboard, mouse, etc., and a CPU, memory (RAM and ROM), and the like (not shown). The above described CPU performs processing in accordance with a program stored in advance in ROM while utilizing a RAM temporary storage function. This program includes a fixed form print information processing program (details described later) for executing a control procedure of FIG. 9 described later. Note that the fixed form print information processing program may be recorded in advance on a suitable recording medium rather than stored on ROM. In such a case, the CPU of the PC 118 reads the recording medium based on suitable timing to acquire the fixed form print information processing program and, once the program is acquired, the CPU executes the program.

Figure 2:
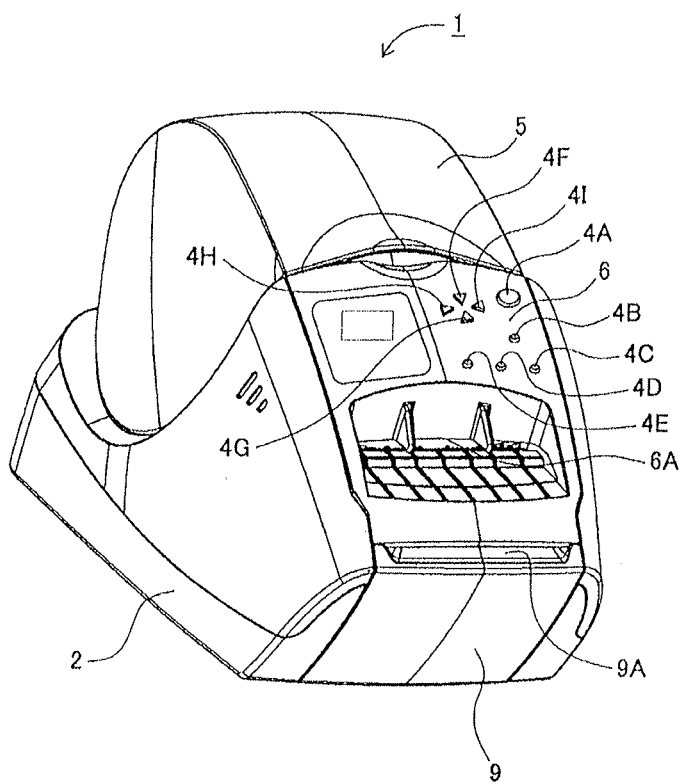
FIG. 2 is a perspective view showing the outer appearance of the print label producing apparatus, as viewed from the front and above.
Figure 3:
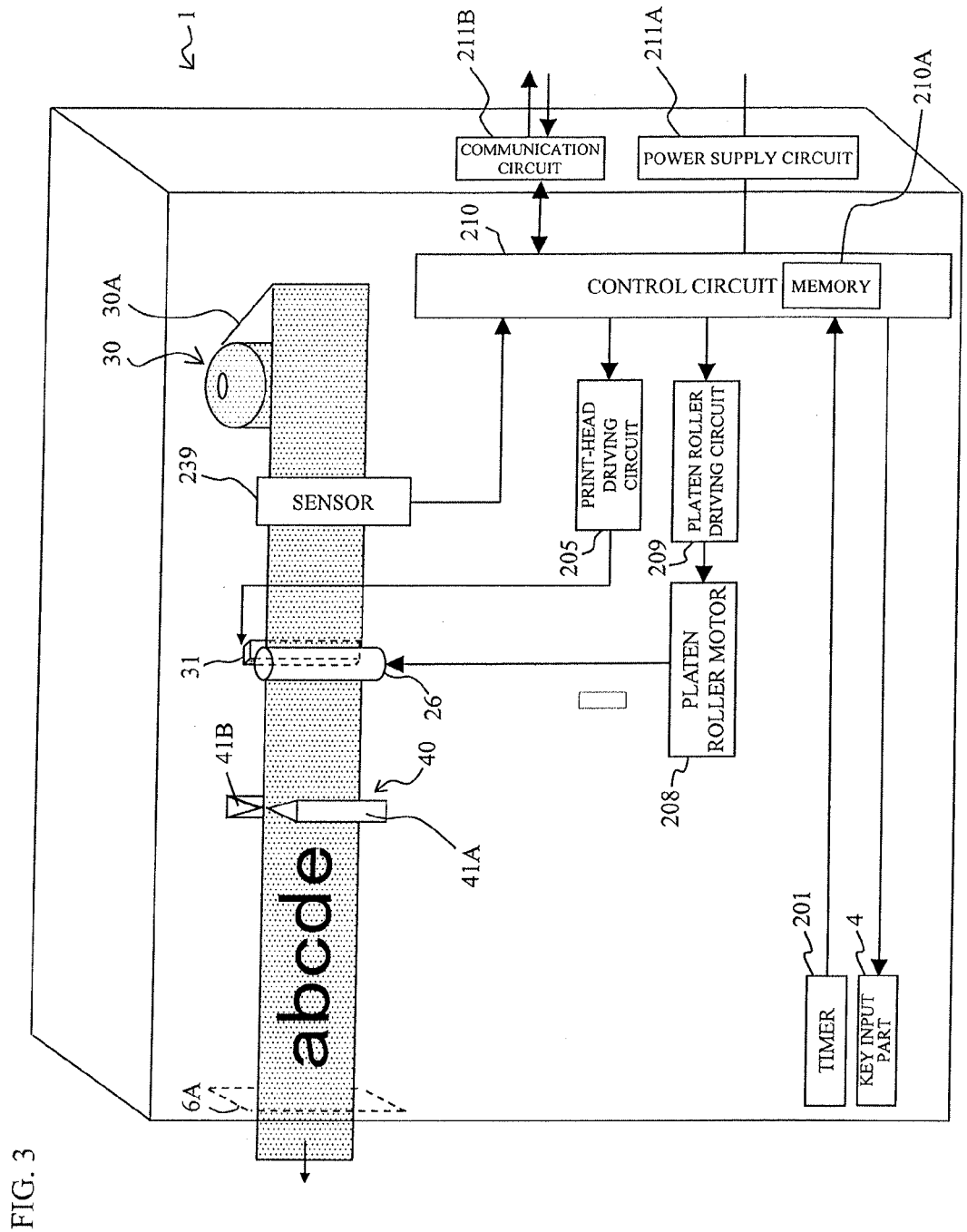
FIG. 3 is a conceptual view showing the control system of the print label producing apparatus.

The configuration of the print label producing apparatus 1 will now be described with reference to FIG. 2 and FIG. 3. In FIG. 2 and FIG. 3, the print label producing apparatus 1 comprises a main body housing 2 made of resin, and an upper cover 5 made of transparent resin and installed in an openable and closeable manner to a rear side upper end edge so that it covers the upper side of the main body housing 2. A discharging exit 6A configured to discharge a label tape 30A after print formation to the outside is formed on a front cover 6 on the front side of the upper cover 5.

The main body housing 2 houses a label tape roll 30 around which is wound the above described label tape 30A of a predetermined width into a roll shape (refer to FIG. 3). This label tape 30A comprises a long thermal sheet (so-called thermal paper) having self chromogenic characteristics, and a separation sheet bonded to one surface of the thermal sheet via an adhesive. The label tape roll 30 is made into a cartridge, for example, and a cartridge holder (not shown) that freely detaches this cartridge is provided to the main body housing 2. Note that, rather than a cartridge type as described above, the label tape roll 30 may be directly housed inside the main body housing 2 so that the label tape 30A is fed out while the label tape roll 30 is rotated inside the main body housing 2.

The label tape 30A fed out from the label tape roll 30 is fed from a platen roller 26 (refer to FIG. 3). The platen roller 26 is driven by a platen roller motor 208. A feeding force acts on the label tape 30A via that drive, feeding out the label tape 30A from the label tape roll 30. The platen roller motor 208 is controlled by the platen roller driving circuit 209. The fed label tape 30A is guided between a thermal head 31 and the platen roller 26 to the discharging exit 6A. Note that, if a suitable identification mark is provided to the above described label tape 30A, a sensor 239 detects the mark.

The thermal head 31 comprises a plurality of heating elements (not shown) in a direction orthogonal to the feeding direction of the label tape 30A. The above described platen roller 26 is disposed on a side of the thermal head 31 that faces the surface on which the heating elements are provided. Electricity is conducted to the heating elements in accordance with dot pattern data to be printed, thereby printing the characters, images, etc., on the label tape 30A fed out from the label tape roll 30. Each of the heating elements provided to the thermal head 31 is driven by a print-head driving circuit 205.

A cutter unit 40 comprising a fixed blade 41B and a movable blade 41A is disposed on the inside of the discharging exit 6A (refer to FIG. 3). The label tape 30A on which printing was performed by the thermal head 31 is cut by the reciprocation of the movable blade 41A at a predetermined timing by an actuator (not shown), such as a cutting motor, solenoid, or the like, thereby discharging a print label L (refer to FIG. 4C described later) of a predetermined length from the discharging exit 6A. Note that, rather than performing the cutting operation automatically via the driving force of such an actuator, the operator may perform the cutting operation manually by manually reciprocating the movable blade 41A.

An above described key input part 4 is disposed on the front surface part of the upper side of the discharging exit 6A (refer to FIG. 2). The key input part 4 comprises a plurality of (nine according to this example) keys 4A, 4B, 4C, 4D, 4E, 4F, 4G, 4H, and 4I.

A tray member 9 is installed in a freely openable and closeable manner to the lower side edge of the front cover 6 so that it covers the front side of the front cover 6 (refer to FIG. 2). The tray member 9 opens when the operator hooks a finger onto a concave part 9A formed on the upper end, rotating the finger toward the front side. Note that, while not shown, an inlet to which a power code (not shown) is connected and a plurality of Universal Serial Bus (USB) connectors are provided to the back surface of the main body housing 2. A power switch configured to turn the power supply of the apparatus ON and OFF by the power supplied via the above described power cord is provided to a suitable location on the main body housing 2 (or, any one of the keys 4A-4I may comprise this power switch function). Connection with the PC 118 is possible via the communication line NW using the above described USB connectors.

A control circuit 210 is a so-called microcomputer, and comprises a memory 210A made of RAM and ROM, for example. While detailed illustrations are omitted, the control circuit comprises a CPU (central processing unit), etc., in addition to the memory 210A. This CPU performs processing in accordance with a program stored in advance in ROM while utilizing a RAM temporary storage function. This program includes a print label producing program for executing a control procedure of FIG. 8 described later. The control circuit 210 controls the operation of the overall print label producing apparatus 1 via the platen roller driving circuit 209, the print-head driving circuit 205, etc. That is, the control circuit 210 executes printing by the thermal head 31 while feeding out the label tape 30A from the platen roller 26 in accordance with the edited print data (including the template described later) transferred from the PC 118, thereby producing the print label L.

Further, a timer 201 configured to clock the current time and the above described key input part 4 are connected to the control circuit 210. Although not shown, a cutting driving circuit configured to control the actuator for the above described cutting is also connected. Note that the control circuit 210 is supplied power via a power circuit 211A connected to the above described power cord, and connected to the above described communication line NW via a communication circuit 211B. As a result, the control circuit 210 is capable of exchanging information with the above described PC 118 connected to the communication line NW, a server (not shown), other terminals, and the like.

Special Characteristics of this Embodiment

In the above described basic configuration, the special characteristic of this embodiment lies in the fact that the mode of the character string formed into print on the print label L by the print label producing apparatus 1 is made to conform closer to the mode of the character string intended by the operator when the operator edited the template using the PC 118. In the following, details on the functions will be described in order.

Producing a Print Label Using a Template

According to this embodiment, the PC 118 is connected to the print label producing apparatus 1 as previously described. The operator can produce the print label L by performing an editing operation on the editing screen of the display part 118a via the operation part 118b of the PC 118. At this time, according to this embodiment, a template of fixed form print information is prepared so that the operator can simply produce the print label L of a desired mode. The template generally includes a diagram section of frames, ruled lines, and the like, and a character string section suitably disposed in a position associated with that diagram section (in some cases, there is no diagram section). Further, the character string section normally includes a section where the operator can freely input operations. According to this embodiment, the operator can produce a print label L using a template by performing suitable input operations with respect to the template, editing the above described character string section, and then transferring the edited template to the print label producing apparatus 1 using the PC 118.

Figure 4A:
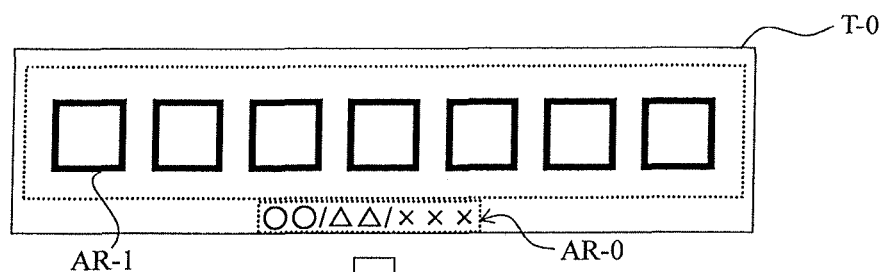
FIG. 4A is a conceptual explanatory view showing a template before editing, and a template after editing of print labels formed by the templates.

FIG. 4A shows a conceptual configuration of an original template T-0 before the above described editing. In FIG. 4A, the original template T-0 in this example has prepared in advance an area AR-1 for printing main text corresponding to a character string of seven characters (in this example, the alphabet characters "abcdefg" as described later), and an area AR-0 provided therebelow for printing subordinate text (in this example, the characters indicating the current time information, such as "2011/1224/0742" as described later). Note that the areas AR-0 and AR-1 are actually blank as is at this point in time since nothing has been input in the areas.

Figure 4B:
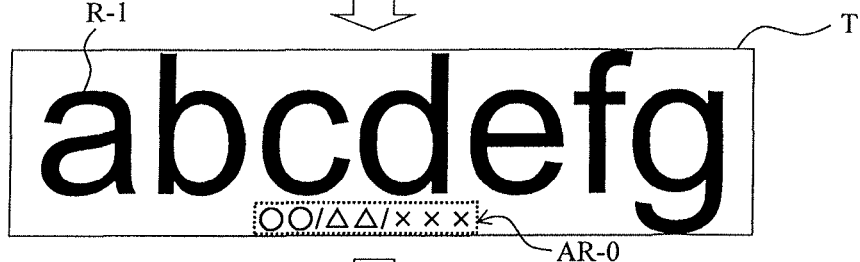
FIG. 4B is a respective example of a conceptual explanatory view showing a template before editing, and a template after editing of print labels formed by the templates.

The operator can perform desired editing using the operation part 118b with the above described original template T-0 displayed on the editing screen of the display part 118a. For this editing, a predetermined application program (a so-called editor) for producing fixed form print information is preinstalled on the PC 118. FIG. 4B shows a conceptual configuration of a template T after this editing. In FIG. 4B, a character string R-1 of "abcdefg" is input via the above described editing of the operator into the area AR-1 in this example. Note that the area AR-0 is blank as is at this point in time since it is a location where the print label producing apparatus 1 will input a character string according to the time information from the above described timer 201 (and is not edited by the operator).

Figure 4C:
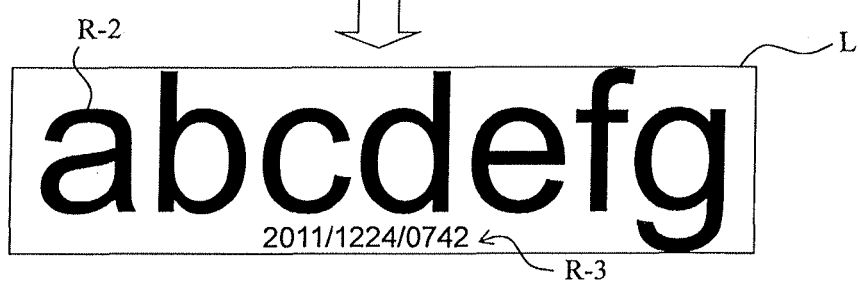
FIG. 4C is another respective example of a conceptual explanatory view showing a template before editing, and a template after editing of print labels formed by the templates.

Here, a predetermined application program (a so-called transfer manager) for transferring fixed form print information is preinstalled on the PC 118. The operator can verify the contents of the edited template T via a predetermined transfer screen display on the display part 118a by the above described application program for transferring fixed form print information, and then transfer the template T to the print label producing apparatus 1. The print label producing apparatus 1 produces the print label L using this transferred template T. FIG. 4C shows an example of the formed print label L. In FIG. 4C, a character string R-2 of "abcdefg" corresponding to the character string R-1 of "abcdefg" of the above described template T is formed into print on the print label L in this example. Further, the current time at that moment is input into the area AR-0 of the above described template T based on the time information acquired from the timer 201 as previously described when the print label L is produced, forming into print a character string R-3 of "2011/1224/0742" which indicates the current time under the character string R-2. Note that, after the above described transfer, the print label L may be produced with the print label producing apparatus 1 alone, disconnected from the PC 118.

Changing the Print Mode Due to Font Inconsistency

In the PC 118 of this embodiment, fonts that take into consideration visibility and aesthetics from the viewpoint of the operator are prepared as font data that expresses the shape of characters. That is, as shown in FIG. 5A, according to the font, font comprising both width direction margin areas S-1 and S-2 on both tape width direction end sides and longitudinal direction margin areas S-3 and S-4 on both tape longitudinal direction end sides of the character string R-1 are prepared for the character string R-1 on the display screen (also refer to an edit preview display screen 16c of FIG. 6 described later).

Figure 5A:
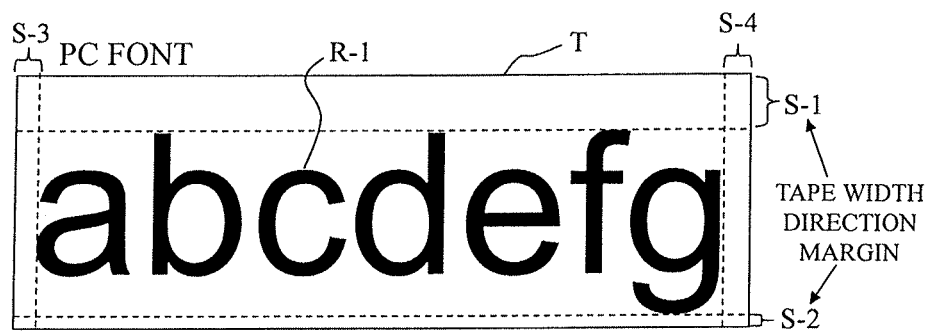
FIG. 5A is a conceptual explanatory view respectively showing a template displayed on the operation terminal and a print label formed by a print label producing apparatus according to the template.
Figure 5B:
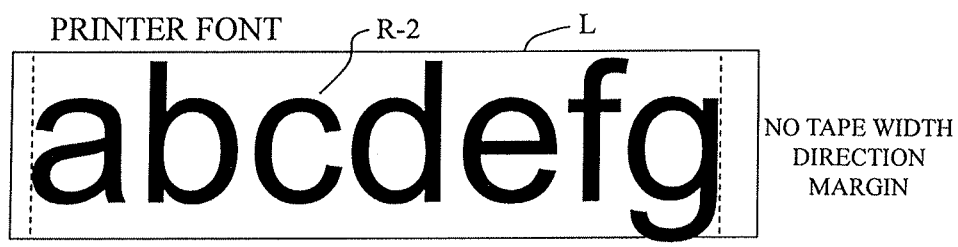
FIG. 5B is another example of a conceptual explanatory view respectively showing a template displayed on the operation terminal and a print label formed by a print label producing apparatus according to the template.

On the other hand, the print label producing apparatus 1 forms print on the label tape 30A, which is restricted in size in the tape width direction, and thus, unlike the above, has prepared a font that does not have a margin area on both tape width direction end sides such as the above described width direction margin areas S-1 and S-2 for the character string R-2, as shown in FIG. 5B.

Accordingly, when the template T is transferred to the print label producing apparatus 1 to produce the print label L as described above, the mode of the character string R-1 of the template T intended by the operator at the time of editing slightly differs from the mode of the character string R-2 of the print label L due to the difference of whether or not the above-described width direction margin areas S-1 and S-2 of the font are present, as is understood from the comparison of FIG. 5A and FIG. 5B.

Margin Area Deletion Process

According to this embodiment, to avoid the above-described adverse effects that result from inconsistency between the width direction margin areas S-1 and S-2 on both tape width direction end sides of the font on the PC 118 side and the font on the print label producing apparatus 1 side, a deletion process of the width direction margin areas S-1 and S-2 of the template T is performed on the PC 118. This process will now be described with reference to FIG. 6 and FIG. 7.

Input Operation Screen when Producing a Template

Figure 6:
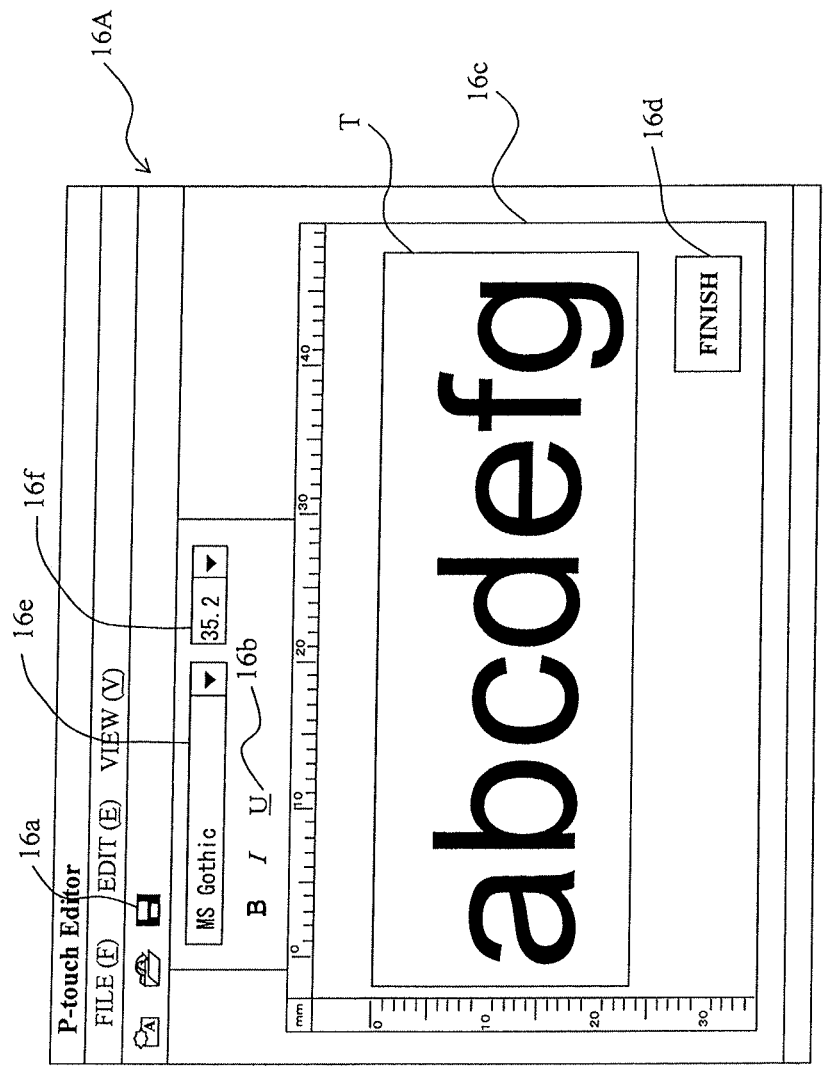
FIG. 6 is an explanatory view showing an input operation screen of an application program for producing fixed form print information, displayed on a display part of the operation terminal.

FIG. 6 shows an example of an input operation screen 16A displayed on the display part 118a based on the above described application program for producing fixed form print information installed in the above described PC 118. In FIG. 6, the input operation screen 16A is provided with a processing icon 16a, an editing icon 16b, the edit preview display screen 16c, a font type display area 16e, and a character size display area 16f for performing various processing on the edited data.

The template T based on the application program for producing fixed form print information is produced by a suitable operation performed by the operator using the operation part 118b on the edit preview display screen 16c. At this time, the width direction margin areas S-1 and S-2 on both tape width direction end sides exist on the template T.

Note that an edit finish button 16d is provided on the lower side of the preview display screen 16c. For example, when the operator operates the operation part 118b and clicks this edit finish button 16d, the input operation screen 17A of the application program for transferring fixed form print information automatically opens on the input operation screen 16A.

Input Operation Screen when Transferring a Template

Figure 7:
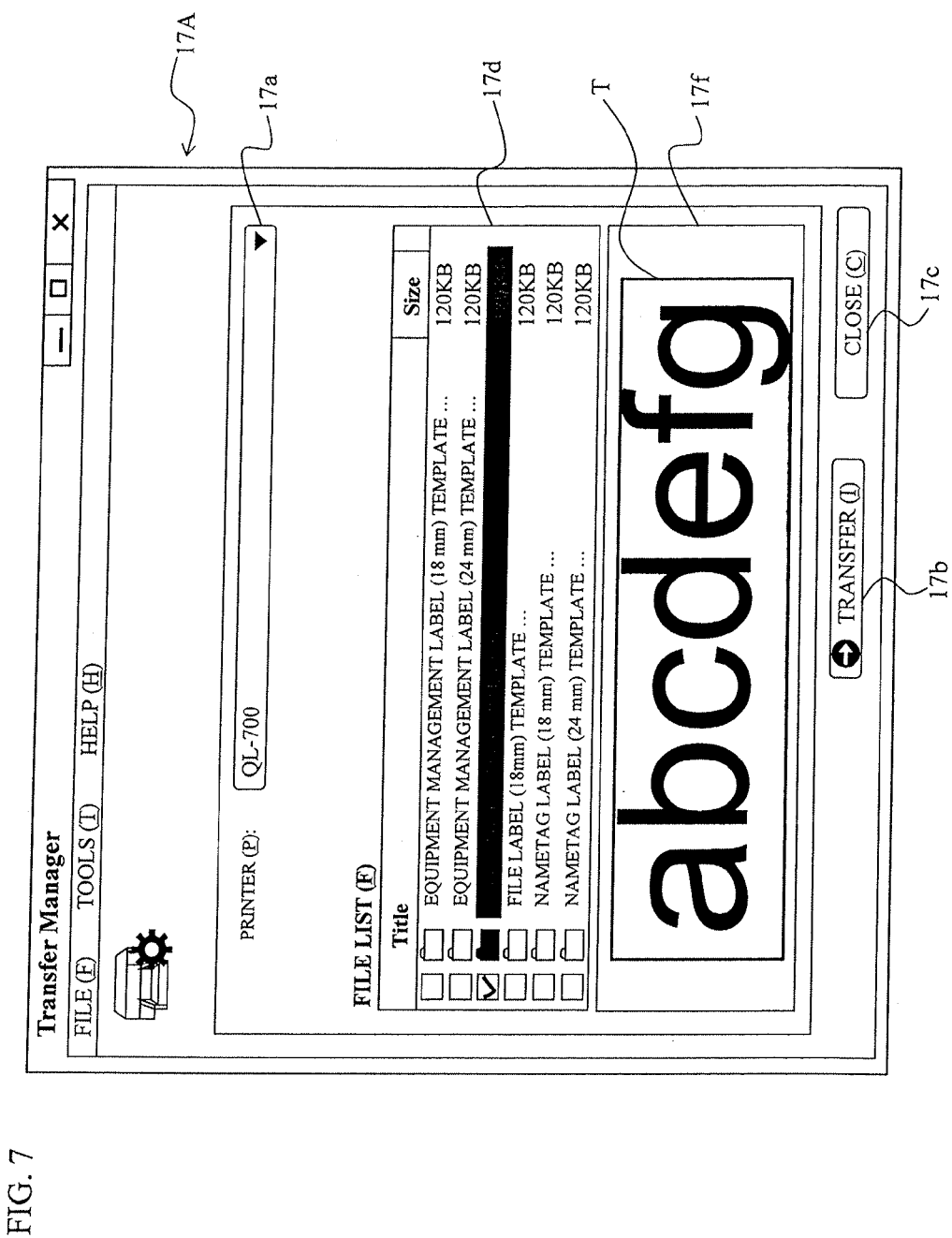
FIG. 7 is an explanatory view showing an input operation screen of an application program for transferring fixed form print information, displayed on a display part of the operation terminal.

FIG. 7 shows an example of the above described input operation screen 17A. This input operation screen 17A is provided with an equipment display box 17a configured to selectably display the model name of the print label producing apparatus 1, a Transfer button 17b, a Close button 17c, a template list box 17d that displays the plurality of prepared templates T in list format on the PC 118, and a transfer preview display screen 17f where the preview images corresponding to each template T are displayed.

According to this example, a plurality of model names of the print label producing apparatus 1 is displayed together (via a pull-down display in this example) in the equipment display box 17a. When the operator suitably operates the operation part 118b and selects one of the model names of the print label producing apparatus 1 displayed in this manner, a search is conducted for the template T corresponding to the selected model name. This search result is displayed in list format in the above described template list box 17d.

The name, version name, and capacity (size) of each of the templates T are displayed in that order in the template list box 17d. According to this example, six types of templates T corresponding to the selection of "QL-700" in the above described equipment display box 17a are displayed: "Equipment management label (18 mm) template," "Equipment management label (24 mm) template," "File label (12 mm) template," "File label (18 mm) template," "Nametag label (18 mm) template," and "Nametag label (24 mm) template."

On the other hand, a check box for allowing the operator to select the template T is provided on the left end of the display of the name of each template T in the template list box 17d. When the operator suitably operates the operation part 118b and enters a check in one of the check boxes of the above described templates T displayed in list format to select the template T, an image of this template T is displayed in a preview on the transfer preview display screen 17f. At this time, as previously described, in a case where the print label producing apparatus 1 is to form print on the label tape 30A that is restricted in size in the tape width direction, the previously described width direction margin areas S-1 and S-2 are deleted in advance (unlike the template T displayed on the input operation screen 16A of the above described FIG. 6) and the template T is displayed on the transfer preview display screen 17f in that deleted mode. FIG. 7 shows an example where the template T, which includes the character string "abcdefg" shown in FIG. 6, is displayed on the input operation screen 17A.

Then, the operator presses the Transfer button 17b by suitably operating the operation part 118b, thereby transferring the template T selected as described above from the PC 118 to the print label producing apparatus 1. Note that the example in the illustration shows the state in which a check has been entered in the "File label (12 mm) template" check box to select that template. Also note that the Close button 17c is a button for closing this input operation screen 17A (or for changing to the screen before the screen change).

Control Procedure of Print Label Producing Apparatus

Figure 8:
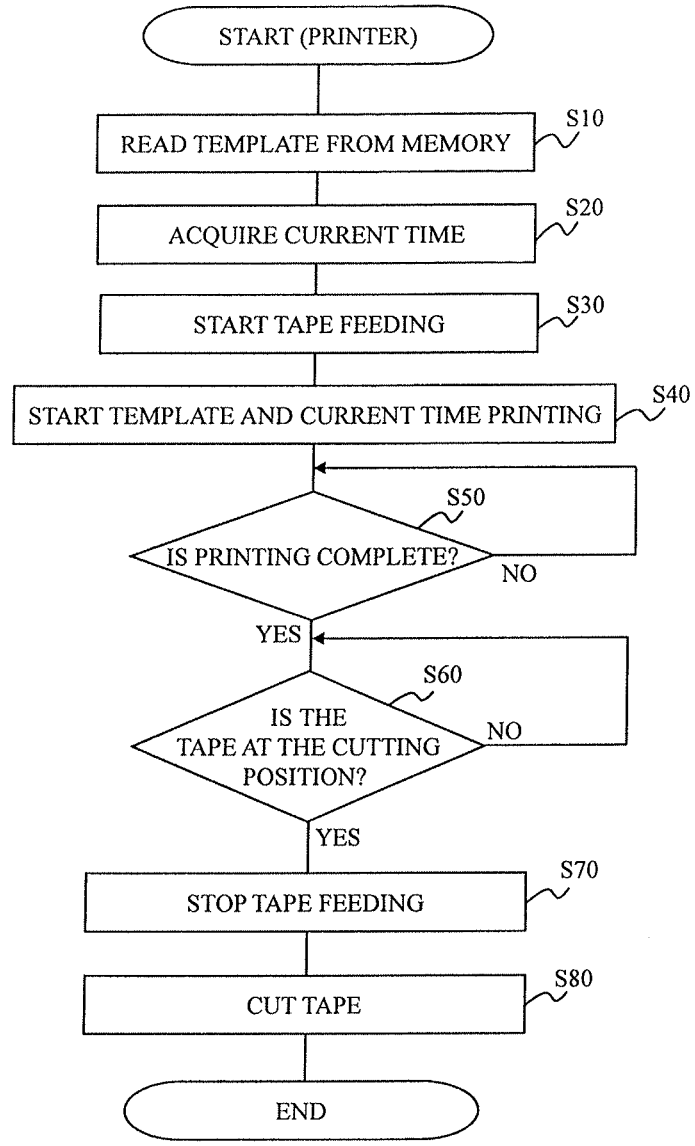
FIG. 8 is a flowchart showing the control procedure executed by the control circuit of the print label producing apparatus.

The contents of the label producing process executed by the above described CPU of the control circuit 210 of the print label producing apparatus 1 for achieving the aforementioned technique will now be described with reference to FIG. 8.

First, in step S10, the above described CPU of the control circuit 210 reads the template T stored in the above described memory 210A already acquired from the PC 118 from the memory 210A.

Subsequently, in step S20, the above described CPU of the control circuit 210 acquires the current time information from the timer 201.

Then, in step S30, the above described CPU of the control circuit 210 outputs a control signal to the platen roller driving circuit 209. With this arrangement, the platen roller motor 208 drives the platen roller 26 and starts the feeding of the label tape 30A.

Then, in step S40, the above described CPU of the control circuit 210 generates print data, which includes the current time acquired in the above described step S20, while using the template T read in the above described step S10, and outputs a control signal corresponding to the generated print data to the print-head driving circuit 205. With this arrangement, the thermal head 31 starts printing the template T (including the previously described character string R-2 and the character string R3 corresponding to the current time) corresponding to the above described print data on the label tape 30A.

Subsequently, in step S50, the above described CPU of the control circuit 210 determines whether or not the printing on the label tape 30A is complete. In a case where the printing on the label tape 30A is complete, the decision is made that condition of step S50 is satisfied (S50: YES) and the flow proceeds to step S60. In a case where the printing on the label tape 30A is not complete (S50: NO), the flow loops and waits until the decision is made that the condition of step S50 is satisfied.

In step S60, the above described CPU of the control circuit 210 determines whether or not the label tape 30A has arrived at a predetermined cutting position, that is, whether or not the end part of the printing range of the thermal head 31 has been fed a predetermined length from the fixed blade 41 of the cutter unit 40, for example. This decision can be sufficiently made by detecting a suitable identification mark provided to the above described label tape 30A using the above described sensor 239, for example. Or, the fed distance from a certain reference position may be detected by a predetermined known method (by counting the number of pulses output by the platen roller driving circuit 209 that drives the platen roller motor 208, which is a stepping motor, etc.). In a case where the label tape 30A has arrived at the predetermined cutting position, the decision is made that condition of step S60 is satisfied (S60: YES) and the flow proceeds to step S70. In a case where the label tape 30A has not arrived at the predetermined cutting position (S60: NO), the flow loops and waits until the decision is made that the condition of step S60 is satisfied.

In step S70, the above described CPU of the control circuit 210 stops the output of the control signal to the platen roller driving circuit 209, for example. With this arrangement, the rotation of the platen roller 26 stops, stopping the feeding of the label tape 30A.

Then, in step S80, the above described CPU of the control circuit 210 outputs a control signal to the cutting driving circuit. With this arrangement, the above described actuator drives the movable blade 41A of the cutter unit 40, and the movable blade 41A cuts the label tape 30A. As a result, for example, the print label L on which the character strings R-2 and R3 are formed into print as shown in the previously described FIG. 5C is formed. This routine then terminates here.

PC Control Procedure

Next, the contents of the template producing process executed by the above described CPU of the PC 118 in order to achieve the aforementioned technique will be described with reference to FIG. 9.

First, in step S110, the CPU of the PC 118 determines whether or not a suitable editing operation (original template selection, reading, character input, etc.) for producing a label was performed by the operator via the operation part 118b. In a case where an editing operation was performed, the decision is made that the condition of step S110 is satisfied (S110: YES), and the flow proceeds to step S120. In a case where an editing operation was not performed, the decision is made that the condition of step S110 is not satisfied (S110: NO), and the CPU loops and waits until the editing operation is performed.

In step S120, the CPU of the PC 118 responds to the operation performed by the operator on the above described input operation screen 16A via the above described operation part 118b, and produces the template T based on the above described application program for producing fixed form print information. As a result, the above described template on which the suitable character string R-1 has been input into the area AR-1 of the above described original template T-0 in the aforementioned example is completed.

Subsequently, in step S130, in response to the operation performed by the operator on the above described input operation screen 17A via the above described operation part 118b, the CPU of the PC 118 executes the deletion process of the above described width direction margin areas S-1 and S-2 automatically set (by the above described application program for producing fixed form print information) around the character string of the template T produced in the above described step S120, based on the above described application program for transferring fixed form print information. Subsequently, the flow proceeds to step S140.

In step S140, the CPU of the PC 118 displays the template T from which the width direction margin areas S-1 and S-2 were deleted in the above described step S130 on the transfer preview display screen 17f of the input operation screen 17A. Subsequently, the flow proceeds to step S150.

In step 150, the CPU of the PC 118 determines whether or not the above described Transfer button 17b displayed on the transfer preview display screen 17f has been operated via the above described operation part 118b. In a case where the Transfer button 17b has been operated, the decision is made that the condition of step S150 is satisfied (S150: YES), and the flow proceeds to step S160. In a case where the Transfer button 17b has not been operated, the decision is made that the condition of step S150 is not satisfied (S150: NO), and the flow loops and waits until the Transfer button 17b is operated.

In step S160, the CPU of the PC 118 transfers the template T displayed on the transfer preview display screen 17f to the print label producing apparatus 1, based on the application program for transferring fixed form print information. This routine then terminates here.

As described above, the PC 118 of this embodiment deletes at least the width direction margin areas S-1 and S-2 of the margin areas automatically set around the character string of the template T, displaying the result on the transfer preview display screen 17f of the input operation screen 17A. Subsequently, the template T is transferred to the print label producing apparatus 1. With this arrangement, the mode of the character string formed into print by the print label producing apparatus 1 can be made to conform closer to the mode of the character string intended by the operator when the operator edited the template T on the PC 118. As a result, the convenience can be improved for the operator.

Note that while only the margins on both tape width direction end sides were deleted in the above, the present disclosure is not limited thereto. That is, both deletions of the margins on both tape width direction end sides as well as deletion of the longitudinal direction margins on both tape longitudinal direction end sides may be executed. In this case, the mode of the character string formed into print by the print label producing apparatus 1 can be made to be more reliably consistent with the mode of the character string intended by the operator when the operator edited the template T on the PC 118.

Note that the present disclosure is not limited to the above described embodiment, and various modifications may be made without deviating from the spirit and scope of the disclosure. The following describes such modifications one by one. Note that, in each modification, the same parts and steps are denoted using the same reference numerals as the above described embodiment, and descriptions thereof will be omitted or simplified as appropriate.

(1) When Displaying a Template Having a Fixed Frame Size

When the template T is to be produced on the edit preview display screen 16c of the PC 118, the template T is sometimes produced under conditions where the overall size of the template T (that is, the outer frame size) is fixed to a predetermined value, for example. In such a case, since the outer frame size is fixed, the displayed font size decreases when the size of the character string disposable area decreases or the number of characters increases, and conversely increases when the size of the character string disposable area increases or the number of characters decreases.

Figure 10A:
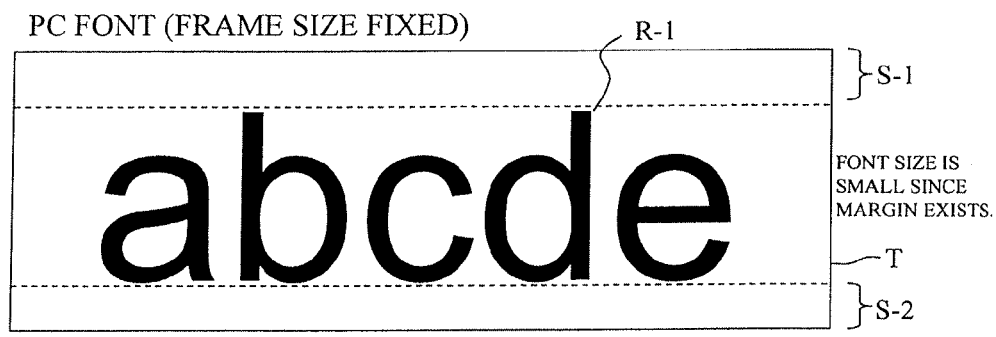
FIG. 10A is an explanatory view showing a template displayed on the operation terminal and a print label formed by the print label producing apparatus according to the template, in a modification wherein a template having a fixed frame size is displayed.

As a result, according to the template T where there exists the width direction margin areas S-1 and S-2 displayed on the display part 118a of the PC 118, such as shown in FIG. 10A, the font size decreases since the size of the character string disposable area decreases. On the other hand, as shown in FIG. 10B, when print is actually formed by the print label producing apparatus 1, the above described character string disposable area is large in size due to the nonexistence of margins equivalent to the above described width direction margin areas S-1 and S-2 as previously described, resulting in an increase in font size.

Figure 10B:
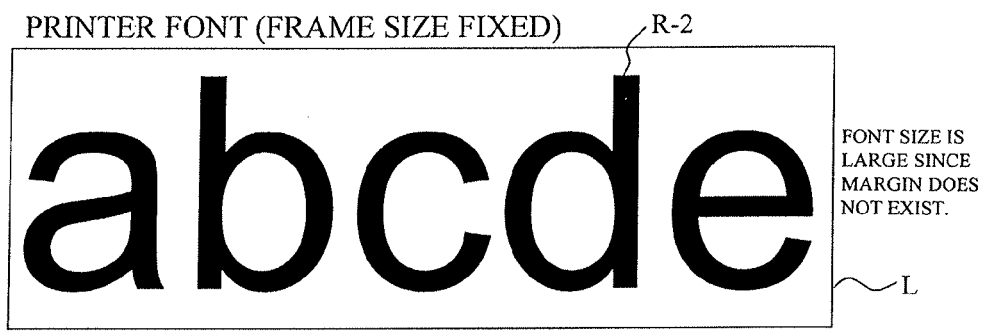
FIG. 10B is another example of an explanatory view showing a template displayed on the operation terminal and a print label formed by the print label producing apparatus according to the template, in a modification wherein a template having a fixed frame size is displayed.

Accordingly, when the template T edited by the operator as previously described is transferred to the print label producing apparatus 1 and the print label L is produced using that template T, the font size of the character string formed into print on the print label L may differ from the font size intended by the operator at the time of editing (due to the above described difference of whether or not the width direction margin areas S-1 and S-2 of the font are present), as shown in the above described FIG. 10A and FIG. 10B.

Here, according to this modification, when at least the width direction margin areas S-1 and S-2 of the margin areas automatically set for the character string of the template T are deleted as previously described, the font size for the character string after that deletion is determined once again (changed). Then, the font size of the above described character string of the final template T is set (converted) to the new font size.

That is, after the width direction margin areas S-1 and S-2 of the template T are deleted, the CPU of the PC 118 determines the font size to be applied to the character string of the template T contained in the above described outer frame once again. Then, the CPU of the PC 118 applies the above described determined font size to the font size of the character string included in the template T where the above described width direction margin areas S-1 and S-2 were deleted, and the result is displayed on the display part 118a.

The control procedure executed by the CPU of the PC 118 of this modification will now be described with reference to FIG. 11. Steps equivalent to those in the above described FIG. 9 are denoted using the same reference numerals, and descriptions thereof will be omitted or simplified as appropriate.

Figure 9:
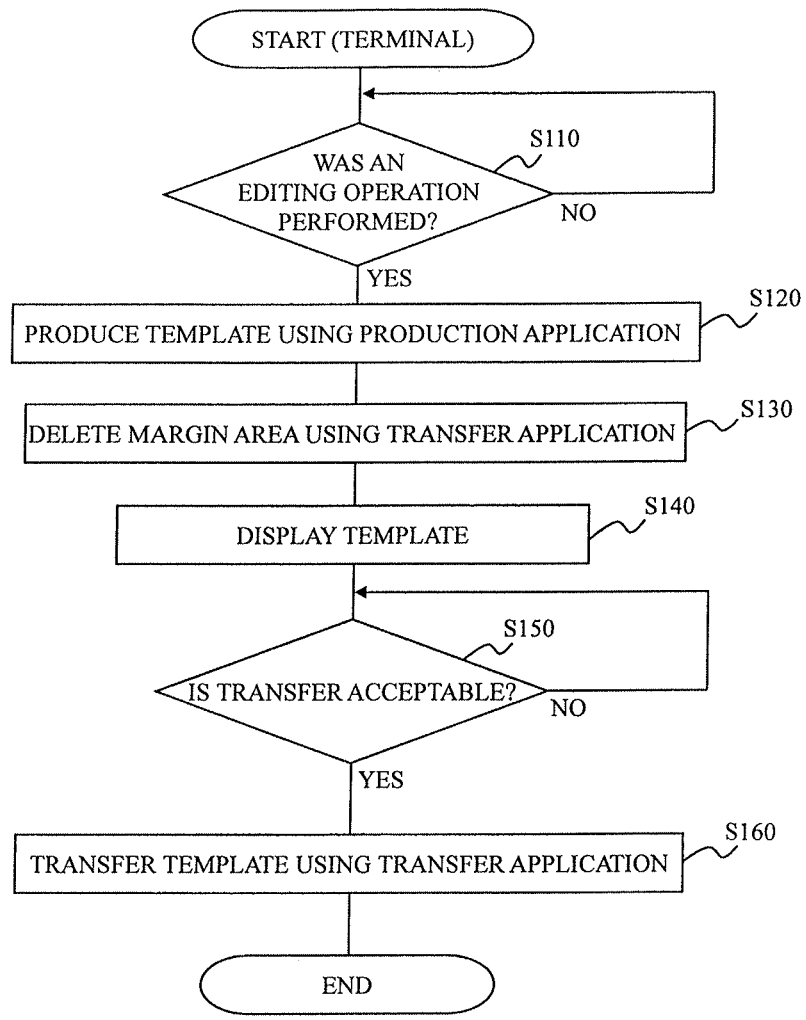
FIG. 9 is a flowchart showing a control procedure executed by the CPU of the PC.
Figure 11:
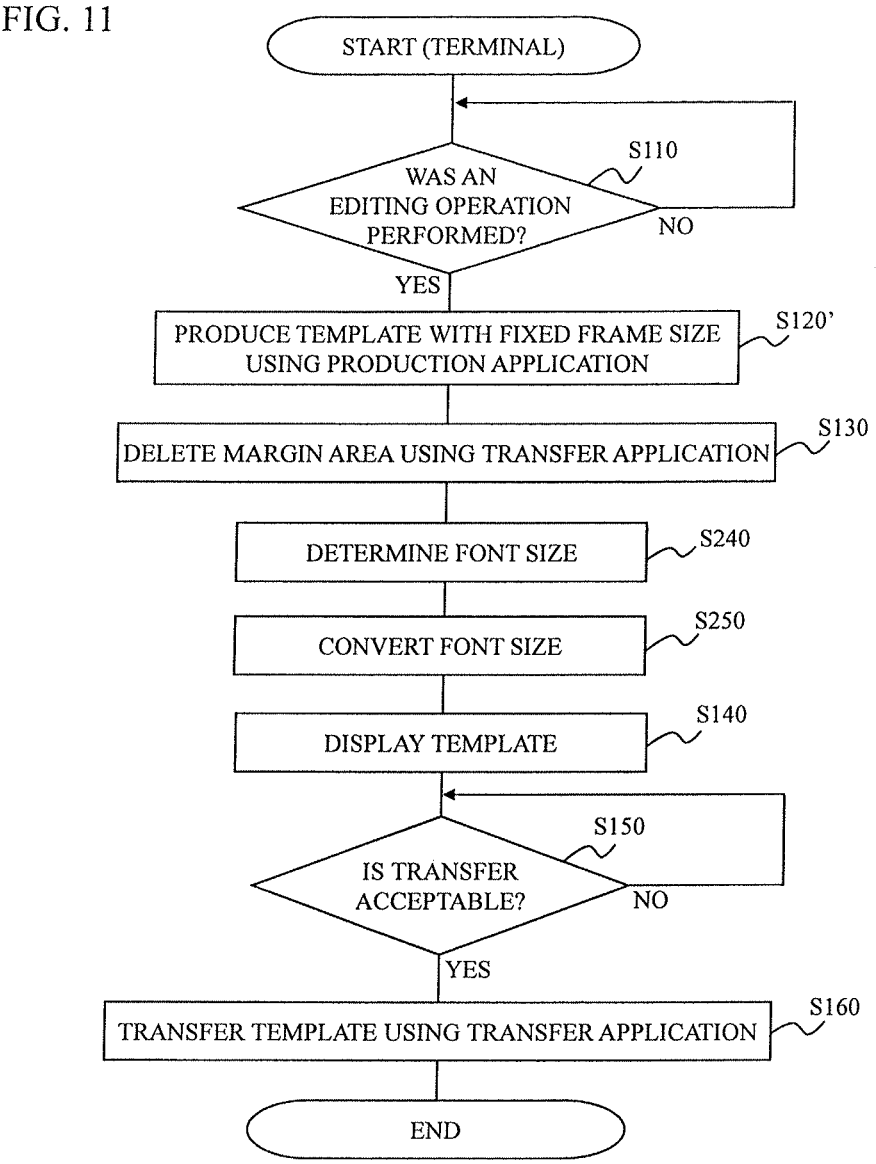
FIG. 11 is a flowchart showing a control procedure executed by the CPU of the PC.

According to the flow shown in FIG. 11, step S120' is provided in place of step S120 of the flow shown in FIG. 9, and step S240 and step S250 are newly provided between step S130 and step S140.

That is, the CPU of the PC 118, as previously described, determines whether or not an editing operation was performed in step S110 and, if the decision is made that the condition is satisfied (S110: YES), the flow proceeds to the newly provided step S120'.

In step S120', the CPU of the PC 118, similar to the previously described step S120, responds to the operation performed by the operator on the above described input operation screen 16A via the above described operation part 118b, and produces the template T based on the above described application program for producing fixed form print information. However, in this step S120', the template T is produced under the condition of the aforementioned fixed outer frame size.

Subsequently, in the same step S130 as the above described FIG. 9, the CPU of the PC 118 executes the deletion process of the above described width direction margin areas S-1 and S-2 automatically set (by the above described application program for producing fixed form print information) around the character string of the template T produced in the above described step S120'. Subsequently, the flow proceeds to the newly provided step S240.

In step S240, the CPU of the PC 118 newly determines (changes) the font size to be applied to the character string in response to the increase in size of the sting disposable area caused by the deletion process of the above described step S130 of the template T contained in the outer frame having a fixed size of a predetermined value. Subsequently, the flow proceeds to step S250.

In step S250, the CPU of the PC 118 applies the font size determined in the above described step S240 to the character string of the template T produced in the above described step S120'. In other words, the CPU converts the font size of the character string of the template T produced in the above described step S120' to the font size determined in the above described step S240.

The subsequent steps S140, S150, and S160 are the same as those of the above described FIG. 9, and descriptions thereof will be omitted.

According to this modification, as previously described, at least the width direction margin areas S-1 and S-2 of the margin areas automatically set for the character string of the template T are deleted, and the font size for the character string after that deletion is determined. Then, the font size of the above described character string is converted to the above described determined font size. With this arrangement, the font size of the character string formed into print by the print label producing apparatus 1 can be made to conform closer to the font size of the character string intended by the operator when the operator edited the template T on the PC 118.

(2) When a Template that Includes Long Text Extended Across a Plurality of Lines is Displayed When the template T is produced on the edit preview display screen 16c of the PC 118, the outer frame size is sometimes fixed to a predetermined value as described above, causing the template to be produced so that the character string extends across a plurality of lines. In such a case, when the size of the character string disposable area and the number of characters are changed, the location where a line break is entered for the character string changes accordingly. In other words, the mode of distribution of the plurality of characters of the character string on each line changes.

Figure 12A:
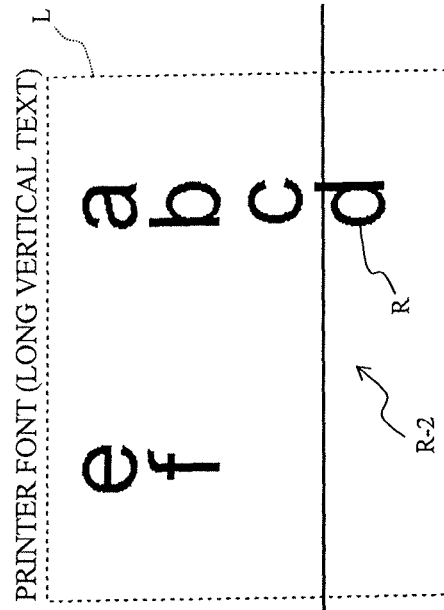
FIG. 12A is an explanatory view showing a template displayed on the operation terminal and a print label formed by the print label producing apparatus according to the template, in a modification wherein a template that includes long text extended across a plurality of lines is displayed.

For example, in FIG. 12A, the character string R-1 made of the six characters "abcdef" is disposed vertically on the template T used for long vertical text. At this time, in a case where the font of each of the characters R comprises the tape width direction (vertical direction) margin area S-3, the characters R are allocated so that the three characters R "a" "b" and "c" are disposed on the right side and the three characters R "d" "e" and "f" are disposed on the left side, in accordance with the height of the template T of the above described fixed size. That is, a line break is automatically entered in front of the character R "d." This is because the font of each of the characters R comprises the above described margin area S-3 on the upper side and, when the three characters R "a" "b" and "c" are first arranged, the open space below these characters R is small, causing "d" to stick out from the template T when an attempt is made to dispose the character R "d" below the character R "c." As a result, the character R "d" cannot be disposed below the character R "c," and the above described line break is entered.

Figure 12B:
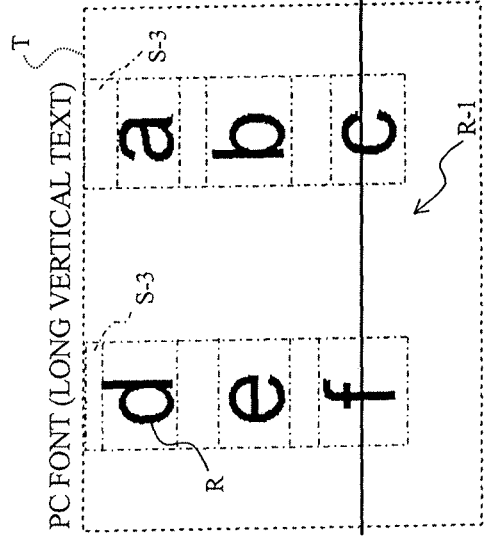
FIG. 12B is another example of an explanatory view showing a template displayed on the operation terminal and a print label formed by the print label producing apparatus according to the template, in a modification wherein a template that includes long text extended across a plurality of lines is displayed.

In contrast, as shown in FIG. 12B, when print is actually formed by the print label producing apparatus 1, a margin equivalent to the above described width direction margin area S-3 does not exist for each of the characters R of the character string R-2 as previously described, further increasing the open space below the three characters R "a" "b" and "c" after arrangement, making it possible to further dispose the character R "d" below the character R "c." Thus, according to the print label L, the characters R are allocated so that the four characters R "a" "b" "c" and "d" of the character string R-2 are disposed on the line on the right side, and the two characters R "e" and "f" are disposed on the line on the left side. That is, a line break is automatically entered in front of the character R "e."

Accordingly, when the template T edited by the operator as previously described is transferred to the print label producing apparatus 1 and the print label L is produced using that template T, the mode of distribution of each of the characters R of the character string R-2 formed into print on the print label L on each line may differ from the mode of distribution intended by the operator at the time of editing due to the above described difference of whether or not the margin area S-3 of the font is present.

Here, according to this modification, when the width direction margin area S-3 automatically set for the upper part of each of the characters R of the character string R-1 of the template T is deleted, the font size for the character string R-1 after that deletion is determined once again (changed), as previously described. Further, the font size of the above described character string of the template T is set (converted) to the new font size. Then, the mode of distribution on each line when each of the characters R of the character string R-1 is arranged on a plurality of lines is determined using that converted font size.

That is, after the width direction margin area S-3 of the template T is deleted, the CPU of the PC 118 determines the font size to be applied to the character string of the template T contained in the above described outer frame once again. Then, the CPU of the PC 118 applies the above described determined font size to the font size of the character string included in the template T where the above described width direction margin area S-3 was deleted. Furthermore, the CPU of the PC 118 determines the mode of distribution on each line when each of the characters R of the character string R-1 is arranged on the plurality of lines according to the above described font size, and the display is executed on the display part 118a in accordance with that determined mode of distribution.

Next, the control executed by the CPU of the PC 118 of this modification will be described with reference to FIG. 13.

The control procedure executed by the CPU of the PC 118 of this modification will now be described with reference to FIG. 13. Steps equivalent to those in the above described FIG. 9 and FIG. 11 are denoted using the same reference numerals, and descriptions thereof will be omitted or simplified as appropriate.

Figure 13:
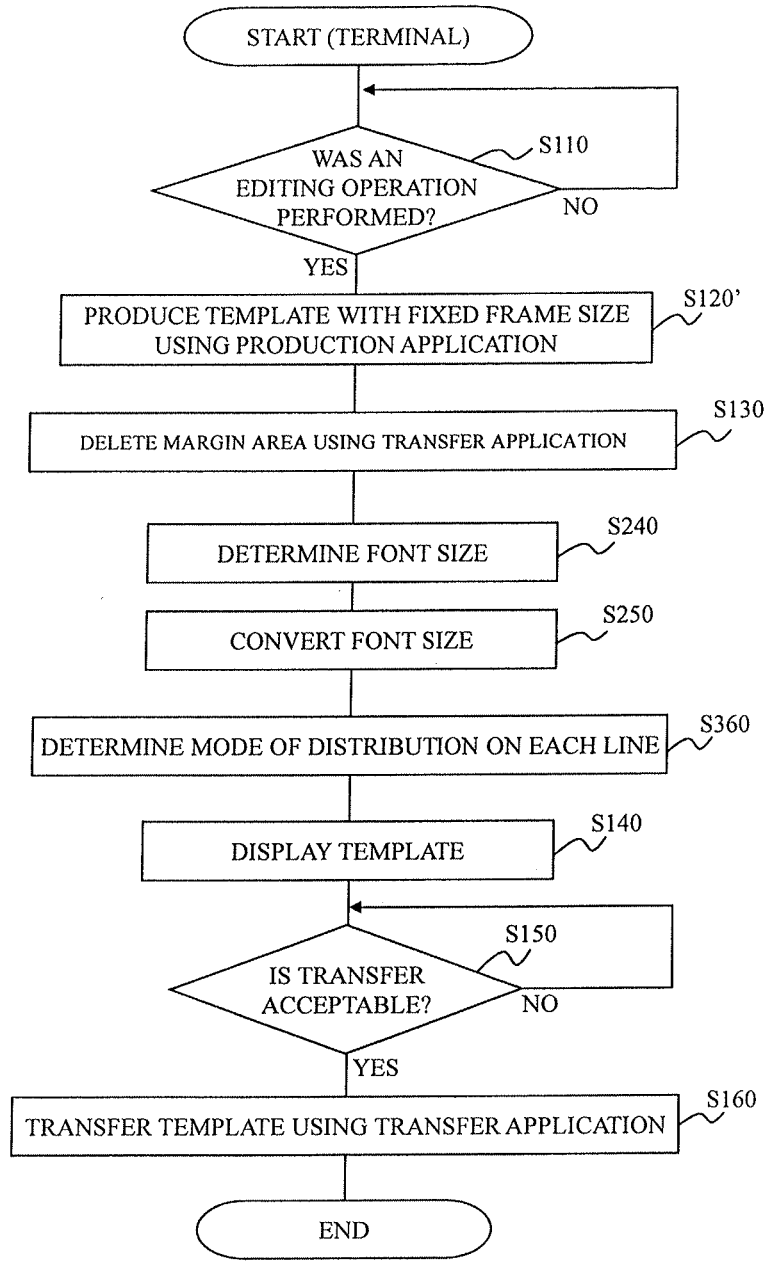
FIG. 13 is a flowchart showing a control procedure executed by the CPU of the PC.

In the flow shown in FIG. 13, step S360 is newly provided between step S250 and step S140 of the flow shown in FIG. 11.

That is, the CPU of the PC 118, as previously described, executes the deletion process of the above described width direction margin area S-3 automatically set (by the above described application program for producing fixed form print information) around the character string of the template T produced in the above described step S120' in the same manner as described above, in step S130 via step S110 and step S120'. Subsequently, as previously described, after the font size determination process of step S240 and the font size replacement process of step S250, the flow proceeds to the newly provided step S360.

In step S360, the CPU of the PC 118 determines the mode of distribution on each line when each of the characters R of the character string R-1 of the template T is arranged on a plurality of lines using the font size converted in the above described step S250.

The subsequent steps S140, S150, and S160 are the same as those of the above described FIG. 11, and descriptions thereof will be omitted.

In this modification, as previously described, each of the characters R of the character string R-1 included in the template T is rearranged and displayed using the font size after conversion. With this arrangement, the mode of distribution of the characters of the character string R-2 formed into print by the print label producing apparatus 1 on a plurality of lines can be made to conform closer to the mode of distribution intended by the operator when the operator edited the template T on the PC 118.

Note that the present disclosure is not limited to the procedures shown in the above described flowcharts of each of the illustrations FIG. 8, FIG. 9, FIG. 11, and FIG. 13, and additions and deletions as well as sequence changes to the procedure may be made without deviating from the spirit and scope of the disclosure.

Further, in the above, the arrow shown in the above described FIG. 3 denotes an example of signal flow, but the signal flow direction is not limited thereto.

Further, other than that already stated above, techniques based on the above described embodiments and each of the modifications may be suitably utilized in combination as well.

What is claimed is:

1. A non-transitory computer-readable recording medium, storing a fixed form print information processing program for executing steps on a control device, said control device provided to an operation terminal that is configured to be connected to a print label producing apparatus configured to form desired print on a tape to produce a print label and comprises an operation device, a display device, said control device, and font data that expresses the shape of characters, said steps comprising:
- a fixed form print producing step for producing fixed form print information used by said print label producing apparatus when producing said print label, using a predetermined application program for producing fixed form print information preinstalled on said operation terminal, based on an operation via said operation device;
- a margin area deleting step for deleting at least a width direction margin area of said width direction margin area and a longitudinal direction margin area respectively set on each side of both ends in a tape width direction as well as each side of both ends in a tape longitudinal direction of font data corresponding to a character string included in said fixed form print information, by said application program for producing fixed form print information;
- a fixed form print displaying step for displaying on said display device said fixed form print information from which said margin area has been deleted in said margin area deleting step; and
- a fixed form print transferring step for transferring said fixed form print information displayed in said fixed form print displaying step to said print label producing apparatus using a predetermined application program for transferring fixed form print information preinstalled on said operation terminal, wherein
- in said fixed form print producing step, said fixed form print information surrounded by an outer frame where a size thereof is fixed to a predetermined value is produced; and
- said steps further comprise:
- a font size determining step for determining a font size to be applied to said character string of said fixed form print information contained in said outer frame of the size of said predetermined value, after margin area deletion is performed in said margin area deleting step; and
- a font size converting step for converting the font size of said character string of said fixed form print information to the font size determined by said font size determining step.

2. The recording medium according to claim 1, wherein:
- in said fixed form print producing step, said fixed form print information surrounded by said outer frame where the size thereof is fixed to the predetermined value is produced, the character string of the fixed form print information extending across a plurality of lines; and
- said steps further comprise:
- a distribution mode determining step for determining a mode of distribution on each of the lines when said character string is to be arranged on said plurality of lines using the font size converted in said font size converting step.

3. A non-transitory computer-readable recording medium, storing a fixed form print information processing program for executing steps on a control device, said control device provided to an operation terminal that is configured to be connected to a print label producing apparatus configured to form desired print on a tape to produce a printer label and comprises an operation device, a display device, said control device, and first font data that expresses the shape of characters, said steps comprising:
- a fixed form print producing step for producing fixed form print information used by said print label producing apparatus when producing said print label by using second font data that expresses the shape of characters, using a predetermined application program for producing fixed form print information preinstalled on said operation terminal, based on an operation via said operation device;
- a margin area deleting step for deleting at least a width direction margin area of said width direction margin area and a longitudinal direction first margin area as character string indisposable area respectively set on each side of both ends in a tape width direction as well as each side of both ends in a tape longitudinal direction of the first font data corresponding to a character string included in said fixed form print information, by said application program for producing fixed form print information;
- a first fixed form print displaying step for displaying in preview in a preview display screen of said display device an image of said fixed form print information from which margin area has been deleted in said margin area deleting step; and
- a fixed form print transferring step for transferring said fixed form print information displayed in said first fixed form print displaying step to said print label producing apparatus using a predetermined application program for transferring fixed form print information preinstalled on said operation terminal.

4. The recording medium according to claim 3, wherein:
in said margin area deleting step, both said width direction margin area and said longitudinal direction first margin area are deleted.

5. The recording medium according to claim 3, wherein:
in said second font data used by said print label producing apparatus, second margin area as character string indisposable area is respectively set on only the each side of both ends in the tape longitudinal direction among the each side of both ends in the tape width direction and the each side of both ends in the tape longitudinal direction.

6. The recording medium according to claim 3, wherein:
said steps further comprise:
- a second fixed form print displaying step for displaying in preview in a preview display screen of said display device an image of said fixed form print information that is produced in said fixed form print producing step and includes both the width direction margin area and the longitudinal direction first margin area on the basis of said first font data,
- in said first fixed form print displaying step, the image of said fixed form print information from which margin area has been deleted in said margin area deleting step by using said application program for producing fixed form print information after said second fixed form print displaying step is displayed in preview in a preview display screen by using said application program for transferring fixed form print information.

\* \* \* \* \*